US012573651B2

(12) United States Patent
Cohen et al.

(10) Patent No.:  US 12,573,651 B2
(45) Date of Patent:    Mar. 10, 2026

(54) SYSTEM AND METHOD FOR GENERATING ELECTRICITY USING PYROLYSIS OF PLASTICS

(71) Applicant: CO-ENERGY LTD., Tel-Aviv (IL)

(72) Inventors: Amir Cohen, Beer Tuvia (IL); Amit Azuly, Beer Sheva (IL); Nimrod Sandlerman, Ramat Gan (IL)

(73) Assignee: CO-ENERGY LTD., Tel Aviv (IL)

( * ) Notice: Subject to any disclaimer, the term of this patent is extended or adjusted under 35 U.S.C. 154(b) by 568 days.

(21) Appl. No.: 18/013,277

(22) PCT Filed: Jun. 30, 2021

(86) PCT No.: PCT/IB2021/055857
§ 371 (c)(1),
(2) Date: Dec. 28, 2022

(87) PCT Pub. No.: WO2022/003586
PCT Pub. Date: Jan. 6, 2022

(65) Prior Publication Data
US 2023/0223573 A1      Jul. 13, 2023

Related U.S. Application Data

(60) Provisional application No. 63/045,862, filed on Jun. 30, 2020.

(51) Int. Cl.
*H01M 8/0612* (2016.01)
*F02B 63/00* (2006.01)
(Continued)

(52) U.S. Cl.
CPC ........... *H01M 8/0612* (2013.01); *F02B 63/00* (2013.01); *F02M 31/16* (2013.01);
(Continued)

(58) Field of Classification Search
CPC ............. H01M 8/2484; H01M 8/0612; H01M 8/04604; H01M 8/04037; H01M 8/04753; H01M 8/0662; F02B 63/00; F02M 31/16
See application file for complete search history.

(56) References Cited

U.S. PATENT DOCUMENTS

| | | |
|---|---|---|
| 4,412,889 A | 11/1983 | Deck |
| 5,129,995 A | 7/1992 | Agarwal |

(Continued)

FOREIGN PATENT DOCUMENTS

| | | |
|---|---|---|
| DE | 102005001569 A1 | 7/2006 |
| WO | 2020/051702 A1 | 3/2020 |

*Primary Examiner* — Sarah A. Slifka
(74) *Attorney, Agent, or Firm* — AlphaPatent Associates Ltd.; Daniel J. Swirsky

(57)         ABSTRACT

A system for generating electricity by pyrolyzing organic materials and feeding the pyrolysis fluid to a battery of fuel-cells. The system includes a pyrolysis reactor receiving organic materials and producing pyrolysis fluid. The fluid pyrolysis is then separated into a plurality of sub-mixtures, each provided via a respective separator output. A plurality of fuel-cell devices for generating electricity using different technologies are each coupled to a respective separator output. A controller controls the pyrolysis reactor, the separator device, and the plurality of fuel-cell devices according to a signal representing a demand for electric power, a signal representing cost of operating at least one of the pyrolysis reactor and the fuel-cell generator, and a signal representing minimum price of electric power.

6 Claims, 7 Drawing Sheets

(51) Int. Cl.

| | |
|---|---|
| *F02M 31/16* | (2006.01) |
| *H01M 8/04007* | (2016.01) |
| *H01M 8/04537* | (2016.01) |
| *H01M 8/04746* | (2016.01) |
| *H01M 8/0662* | (2016.01) |
| *H01M 8/10* | (2016.01) |
| *H01M 8/12* | (2016.01) |
| *H01M 8/14* | (2006.01) |

(52) U.S. Cl.
   CPC ... *H01M 8/04037* (2013.01); *H01M 8/04604*
      (2013.01); *H01M 8/04753* (2013.01); *H01M*
      *8/0662* (2013.01); *H01M 2008/1095* (2013.01);
      *H01M 2008/1293* (2013.01); *H01M 2008/147*
      (2013.01)

(56) References Cited

U.S. PATENT DOCUMENTS

| | | |
|---|---|---|
| 6,757,590 B2 | 6/2004 | Ross et al. |
| 2005/0003247 A1 | 1/2005 | Pham |
| 2006/0057443 A1 | 3/2006 | Cooper |
| 2009/0286295 A1 | 11/2009 | Medoff et al. |
| 2015/0027385 A1 | 1/2015 | Von Der Osten-Sack et al. |
| 2016/0053182 A1 | 2/2016 | Ericsson et al. |

Fig. 2A   Alkaline Fuel-Cell

Fig. 2B   Molten Carbonate Fuel-Cell

Fig. 2C   Phosphoric Acid Fuel-Cell

Fig. 2D   Direct Methanol Fuel-Cell

Fig. 2E   Proton Exchange Membrane Fuel-Cell

Fig. 2F   Solid Oxide Fuel-Cell

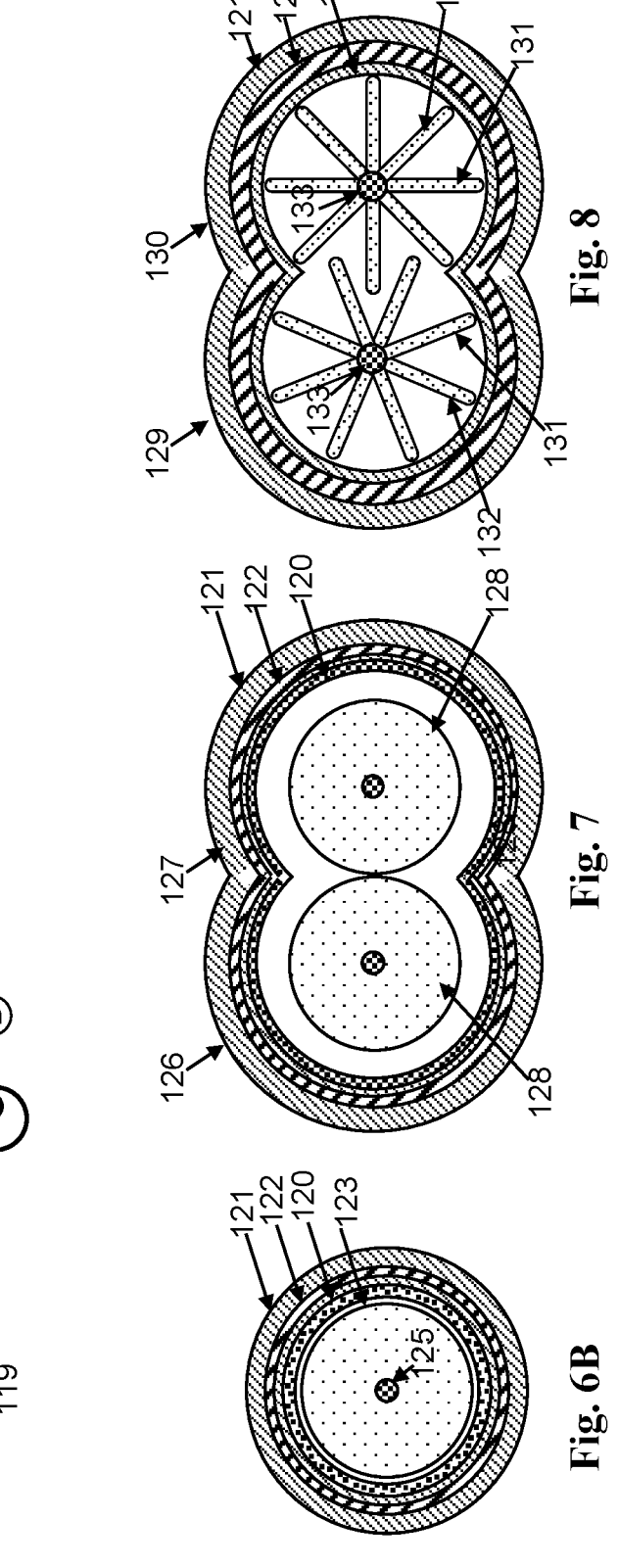

SYSTEM AND METHOD FOR GENERATING ELECTRICITY USING PYROLYSIS OF PLASTICS

FIELD

The method and apparatus disclosed herein are related to the field of generating electricity, and more particularly but not exclusively, to converting plastic and/or any other organic materials into electric energy by integrating continuous pyrolysis with fuel-cell technology.

BACKGROUND

Methods and system of pyrolysis are known, including pyrolysis of plastic materials into fluid combustible materials. The output of the pyrolysis process, namely the combustible materials, may then serve to produce electricity using standard internal combustion generators, or external combustion generators.

The pyrolysis of plastic materials may produce a large variety of fluid combustible materials mainly in the form of hydrocarbons. Internal combustion generator technology may use relatively light hydrocarbons to produce electric energy at relatively higher energy conversion efficiency, while external combustion generator technology may use relatively heavier hydrocarbons to produce electric energy at relatively lower energy conversion efficiency. However, even the higher energy conversion efficiency of the internal combustion electric generator technology is insufficient. There is thus a widely recognized need for, and it would be highly advantageous to have, a system and method for a continuous pyrolysis process, overcoming the above limitations.

SUMMARY OF THE INVENTION

According to one exemplary embodiment, there is provided method and a system for generating electricity by pyrolyzing organic materials and feeding the pyrolysis fluid to a battery of fuel-cells. The method and the system may include a pyrolysis reactor having a pyrolysis input for receiving organic materials and pyrolysis output for producing pyrolysis fluid. The method and the system may additionally include a fluid separator device having an input coupled to the pyrolysis output for receiving the pyrolysis fluid and to separate the pyrolysis fluid into a plurality of sub-mixtures, where each sub-mixtures is provided via a respective separator output of a plurality of separator outputs. The method and the system may additionally include a plurality of fuel-cell devices for generating electricity, where each fuel-cell device including a fuel-cell input coupled to a respective separator output, and an electricity output, where the plurality of fuel-cell generators use a respective plurality of fuel-cell technologies. The method and the system may additionally include a controller controllably coupled to the pyrolysis reactor, the separator device, and the plurality of fuel-cell devices, and including an input for receiving at least one of: a signal representing a demand for electric power, a signal representing cost of operating at least one of the pyrolysis reactor and the fuel-cell generator, and a signal representing minimum price of electric power. The controller may then determine the flow of plastic materials into the pyrolysis input, and the flow of sub-mixtures of hydrocarbons into each fuel-cell generator. The controller may determine each of the flows are determined according to at least one of: the signal representing demand for electric power, the signal representing cost of operating at least one of the pyrolysis reactor and the fuel-cell generator, and the signal representing minimum price of electric power.

According to another exemplary embodiment the continuous pyrolysis system may also include at least one electrical element including at least one of ferromagnetic and ferrimagnetic material within the pyrolysis chamber, an electrical heating device for heating the least one inductive element including at least one of ferromagnetic and ferrimagnetic material within the pyrolysis chamber, the inductive heating device including an electric power input, where the electricity output of at least one fuel cell is electrically coupled to the electric power input of the inductive heating device.

According to yet another exemplary embodiment the separator may additionally include at least one of: an output for light combustion fluid adapted for internal combustion engine and an output for heavy combustion fluid adapted for external combustion engine, and at least one of: an internal combustion electric generator including: a generator of electricity mechanically coupled to an internal combustion engine coupled to an output of the separator for receiving fuel, and an external combustion electric generator including: a generator of electricity mechanically coupled to a steam boiler thermally coupled to a combustion chamber coupled to an output of the separator for receiving fuel. The controller may be additionally controllably coupled to at least one of: the separator output for light combustion fluid, the separator output for output for heavy combustion fluid, the internal combustion electric generator, and the internal combustion electric generator.

According to still another exemplary embodiment the plurality of fuel-cells includes at least one of: a hydrogen fuel cell, an alkali fuel cell, a molten carbonate fuel cell, phosphoric acid fuel cell, proton exchange membrane fuel cell, solid oxide fuel cell, and direct methanol fuel cell, where each output of the plurality of separator outputs is coupled to at least one of the plurality of fuel-cells, and where the controller is additionally controllably coupled to at least one of the separator outputs and the respective fuel cell.

Unless otherwise defined, all technical and scientific terms used herein have the same meaning as commonly understood by one of ordinary skill in the relevant art. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings:

FIG. 6A is a simplified illustration of cut through the longitude of an inductive continuous pyrolysis system with a stationary body;

FIG. 6B is a simplified illustration of cut through the latitude of the inductive continuous pyrolysis system with a stationary body;

FIG. 7 is a simplified illustration of cut through the latitude of an inductive continuous pyrolysis system with a dual stationary body and a spiral conveyer;

FIG. 8 is a simplified illustration of cut through the latitude of an inductive continuous pyrolysis system with a dual stationary body and a propeller conveyer;

DETAILED DESCRIPTION

Figure 1:
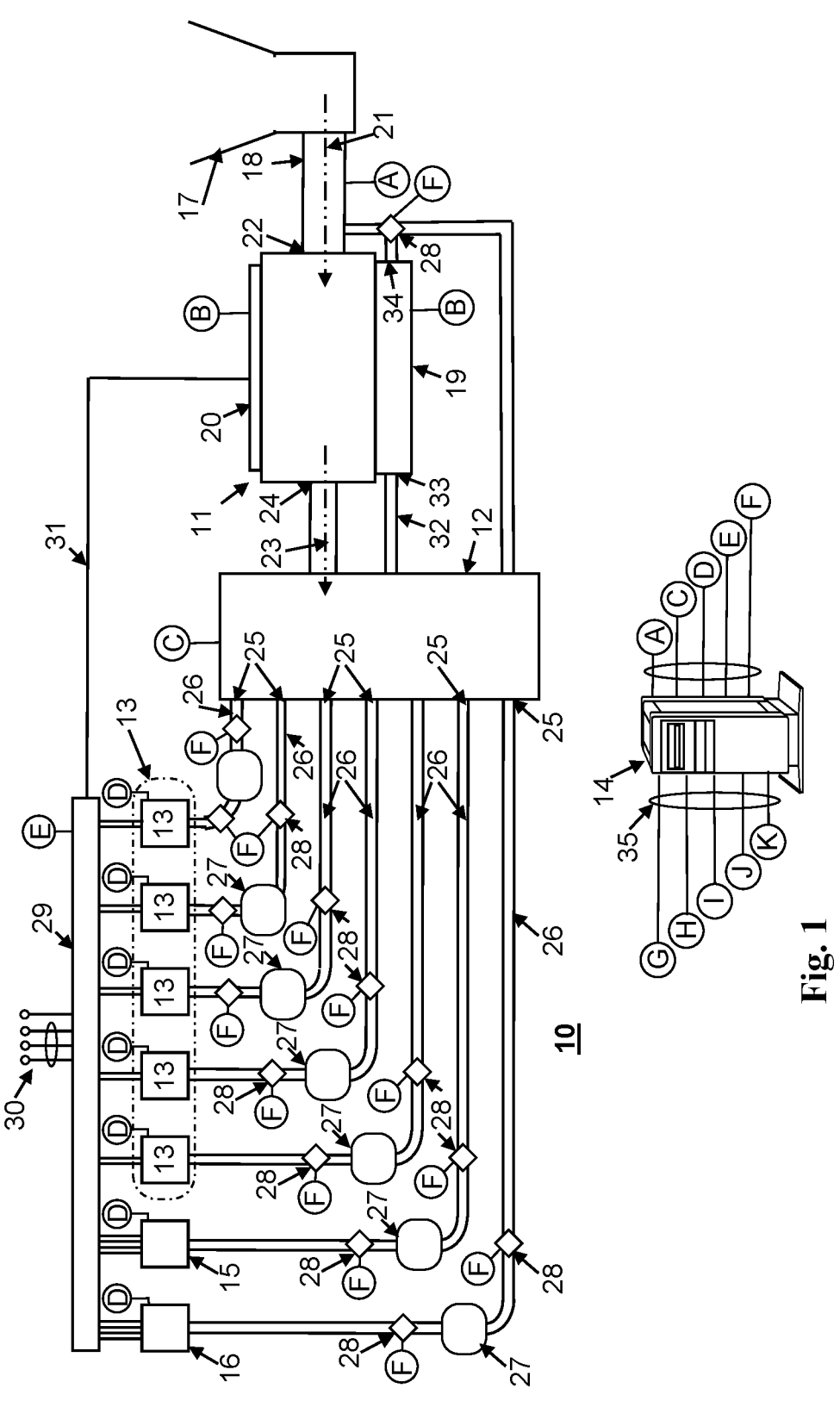
FIG. 1 is a simplified illustration of a generator system for generating electricity by pyrolysis of plastic materials and using fuel-cells.

The present embodiments comprise systems and methods for continuous pyrolysis, and particularly, though not limited to, continuous pyrolysis process of plastic materials, such as polyethylene, polypropylene, etc.

Before explaining at least one embodiment in detail, it is to be understood that the embodiments are not limited in its application to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different figures may use different scales and different scales can be used even within the same drawing, for example different scales for different views of the same object or different scales for the two adjacent objects.

Reference is now made to FIG. 1, which is a simplified illustration of a generator system 10 for generating electricity from plastic materials. As shown in FIG. 1, generator system 10 may include a pyrolysis reactor 11, a separator subsystem 12, a plurality of fuel-cell subsystems 13, and a controller 14. Generator system 10 may include an internal combustion electric generator 15 and/or an external combustion electric generator 16.

As shown in FIG. 1, pyrolysis reactor 11 may include a feeding container 17 with a buffer chamber 18, and a heating subsystem such as a combustion heating container 19, and/or an electrical heating subsystem 20. Plastic materials may be provided to the pyrolysis reactor 11 via feeding container 17 and via buffer chamber 18. Buffer chamber 18 may serve to block the intake of ambient Oxygen. Combustion heating container 19, and/or an electrical heating subsystem 20 may serve to heat the pyrolysis chamber of pyrolysis reactor 11. The pyrolysis reactor 11 may therefore receive plastic materials 21 into the pyrolysis input 22 (for example using a conveyer, not shown) and produce a pyrolysis fluid 23 at the pyrolysis output 24. Further details about various configurations of pyrolysis reactor 11 are provided below.

It is appreciated that electrical heating subsystem 20 may be any type of heating system using electricity. Particularly, electrical heating subsystem 20 may use electric induction. Hence, hereinafter, the term electrical heating subsystem 20 and induction subsystem 20 may be used interchangeably to refer to any type of electrical heating and particularly to heating via electric induction.

Pyrolysis reactor 11 is coupled to separator subsystem 12 via an output pipe providing the pyrolysis fluid to the separator subsystem 12. Separator subsystem 12 separates the pyrolysis fluid into various types of output fluids, or output mixtures (or sub-mixtures) such as output gases and output liquids. Such output fluids may include Hydrogen, CO, $CO_2$ and various Hydrocarbons. Separator subsystem 12 may include a plurality of separator outputs 25 where each of the different sub-mixtures may be provided in a respective separator output 25 of the plurality of separator outputs. Separator subsystem 12 may include a cooling sub-system and/or a reforming sub-system as well as other separation technologies.

Each separator output 25 of separator subsystem 12 is coupled one or more fuel-cells 13, except for some separator outputs 25 that may be optionally coupled to other types of electric generators. Each separator output 25 providing a particular sub-mixture may be coupled to one or more fuel-cells 13 of a particular type for which the particular sub-mixture is adapted.

For example, such other types of electric generators may include internal combustion electric generator 15 and/or an external combustion electric generator 16. Internal combustion electric generator 15 may include a generator of electricity mechanically coupled to an internal combustion engine coupled to an output of the separator for receiving combustion fuel such as light combustion fluid adapted for internal combustion engine. External combustion electric generator 16 may include a generator of electricity mechanically coupled to a steam boiler thermally coupled to a combustion chamber coupled to an output of the separator for receiving combustion fuel such as heavy combustion fluid adapted for external combustion engine.

Each separator output 25 is coupled one or more fuel-cells 13 via a respective pipe 26, so that, each type of fuel-cells 13 is coupled to a pipe carrying a particular sub-mixture adapted for the particular type of fuel-cells 13. Each pipe 26 may include an optional container 27, and or an optional pump and/or valve 28.

While FIG. 1 shows only one pipe coupled to the input of each fuel-cells 13 it is to be understood that some fuel-cell types may have two or more inputs where each input receives a different material. Hence a fuel-cell 13 may be coupled to a plurality of pipes 26, where each such pipe 26 may be coupled to a different separator output 25, for example via a manifold. Such manifold may be installed anywhere in the system of pipes 26, namely in either side of a respective container 27.

Containers 27 may serve as buffers to adapt the production rate of the pyrolysis reactor 11 and separator subsystem 12 to the consumption rate of the respective fuel-cells 13, as determined by controller 14. Containers 27 may also serve for heat conversion, to adapt the temperature of the respective fuel sub-mixture to the requirement of the respective fuel-cell 13. Temperature sensors (not shown) may be provided in pipe system such as in the input of each containers 27, and/or the respective input of each fuel-cell 13. The temperature sensors may be coupled to the controller 14 to enable the controller to control the respective temperature of the respective fuel sub-mixture to the requirement of the respective fuel-cell 13.

While FIG. 1 shows only the pipes coupled to the inputs of the fuel-cells 13 it is to be understood that outputs (not shown) of the fuel-cells may be coupled to pipes (not shown) that may optionally collect excess fluids from the outputs of the fuel-cells 13, and optionally return such excess fluids to the pipe system and respective containers 27. Such excess fluids may be used for other types of fuel-cells 13, for internal or external combustion electric generators, and/or for heating container 19. Water collected from outputs of fuel-cells 13 may be used by separator subsystem 12.

Fuel-cells 13, as well as the optional internal combustion electric generator 15 and/or an external combustion electric generator 16, may be coupled, via their respective electrode connectors, to an electrical load balancer system 29, that may be coupled via an electric grid 30 to one or more electric consumers (electric loads, not shown). Load balancer system 29 may include one or more DC to AC converters to convert the DC electric output of the fuel cells into AC electric power.

The output of the generator system 10 may be used to power the generator system 10. For example, the electric output of the load balancer system 29 may be electrically coupled (31) to the induction subsystem 20 to provide electric power to heat the pyrolysis reactor 11 using induction heating.

For example, a part of the pyrolysis fluid may be used (32) as combustion material for the heating container 19 to heat the pyrolysis reactor 11 using combustion heating. As shown in FIG. 1, heating container 19 may have an input 33 to receive combustible materials, for example from separator subsystem 12, and an output 34. Low-oxygen gaseous material from output 34 may be provided, for example, to buffer chamber 18 to maintain pressure above the ambient pressure to prevent Oxygen entering the pyrolysis reactor 11. $CO_2$ rich gaseous material from output 34 may be provided, for example, to separator system 12.

As shown in FIG. 1, controller 14 may have any number of inputs and outputs including one or more user interfaces enabling a user to set operating parameters of the generator system 10.

The controller 14 may be controllably coupled to any or all of the feeding container 17, buffer chamber 18 and conveyer (e.g., via connector A), pyrolysis reactor 11, heating container 19 and/or induction subsystem 20 (e.g., via connectors B), separator subsystem 12 (e.g., via connector C), fuel-cells 13 (e.g., via connectors D), internal combustion electric generator 15 (e.g., via connector D), external combustion electric generator 16 (e.g., via connector D), load balancer system 29 (via connector E), and pumps and/or valves 28 (e.g., via connector F).

The controller 14 may be receive inputs (35) from various sources, such as sensors (not shown in FIG. 1), for example via connector G, such as temperature sensors discussed above, pressure sensors described below, etc.

The controller 14 may be receive inputs (35) from another computational system or data source (not shown in FIG. 1) in the form of electrical signals. Such signals may be analog signal and/or digital signal such as digital data. Such signal may represent various operating parameters such as a signal representing demand for electric power, a signal representing cost of operating at least one of the pyrolysis reactor and the fuel-cell generator, and a signal representing minimum price of electric power. Such signals may be received, for example, via connectors I, J and K.

The controller 14 may be receive inputs (35) from a user via a user interface and via a user terminal (not shown in FIG. 1), for example via connector H. The user interface may enable the user to set operating parameters and/or operating rules to enable the controller 14 to determine in real-time the operation of the generator system 10 so as to adapt and/or optimize the operation of the generator system 10 according to the received signals.

For example, the user interface may enable the user to set operating parameters and/or operating rules to enable the controller 14 to determine in real-time various flows such as the flow of plastic materials into the pyrolysis input, and flow of sub-mixtures of hydrocarbons into each fuel-cell generator, where each of the flows may be determined controller 14 in real-time according to the signal representing demand for electric power, and/or the signal representing cost of operating at least one of the pyrolysis reactor and the fuel-cell generator, and/or the signal representing minimum price of electric power.

The content of the plastic materials provided to the pyrolysis reactor 11 may change with time, changing the relative amount of types of plastic materials. Thus the content of the pyrolysis fluid produced by the pyrolysis reactor 11 may change with time, changing the relative amount of types of fluid materials, as well as the production of the separator subsystem 12 in each of its outputs 25. Therefore, the amount and quality of sub-mixtures provided to various fuel-cells may vary. Hence the efficiency and therefore the cost of producing electricity may also change in time.

It is appreciated that the term pyrolysis fluid may refer to any type of gas or liquid produced by the pyrolysis system, including the same material in either the gas phase or the liquid phase. For example, adapted to the material and temperature as required by the respective fuel-cell technology.

On the other hand, the demand for electric power may also change in time, as well as the price each of the consumers may pay for the electric power provided via the grid 30.

The controller 14 may therefore control the amount and/or rate and/or flow of input to the pyrolysis reactor 11, as well as the amount and/or rate and/or flow of respective fluid provided to each of the fuel-cells 13, for example, to produce electricity adapted to the power demand and/or at a cost adapted to the payable price.

Reference is now made to FIGS. 2A, 2B, 2C, 2D, 2E, and 2F, which are simplified illustrations of different types of fuel cells 13, according to one exemplary embodiment.

As an option, the illustrations of the fuel-cell types of FIGS. 2A, 2B, 2C, 2D, 2E, and 2F may be viewed in the context of the previous Figures. Of course, however, the illustrations of the fuel-cell types of FIGS. 2A, 2B, 2C, 2D, 2E, and 2F may be viewed in the context of any desired environment. Further, the aforementioned definitions may equally apply to the description below.

Figure 2:
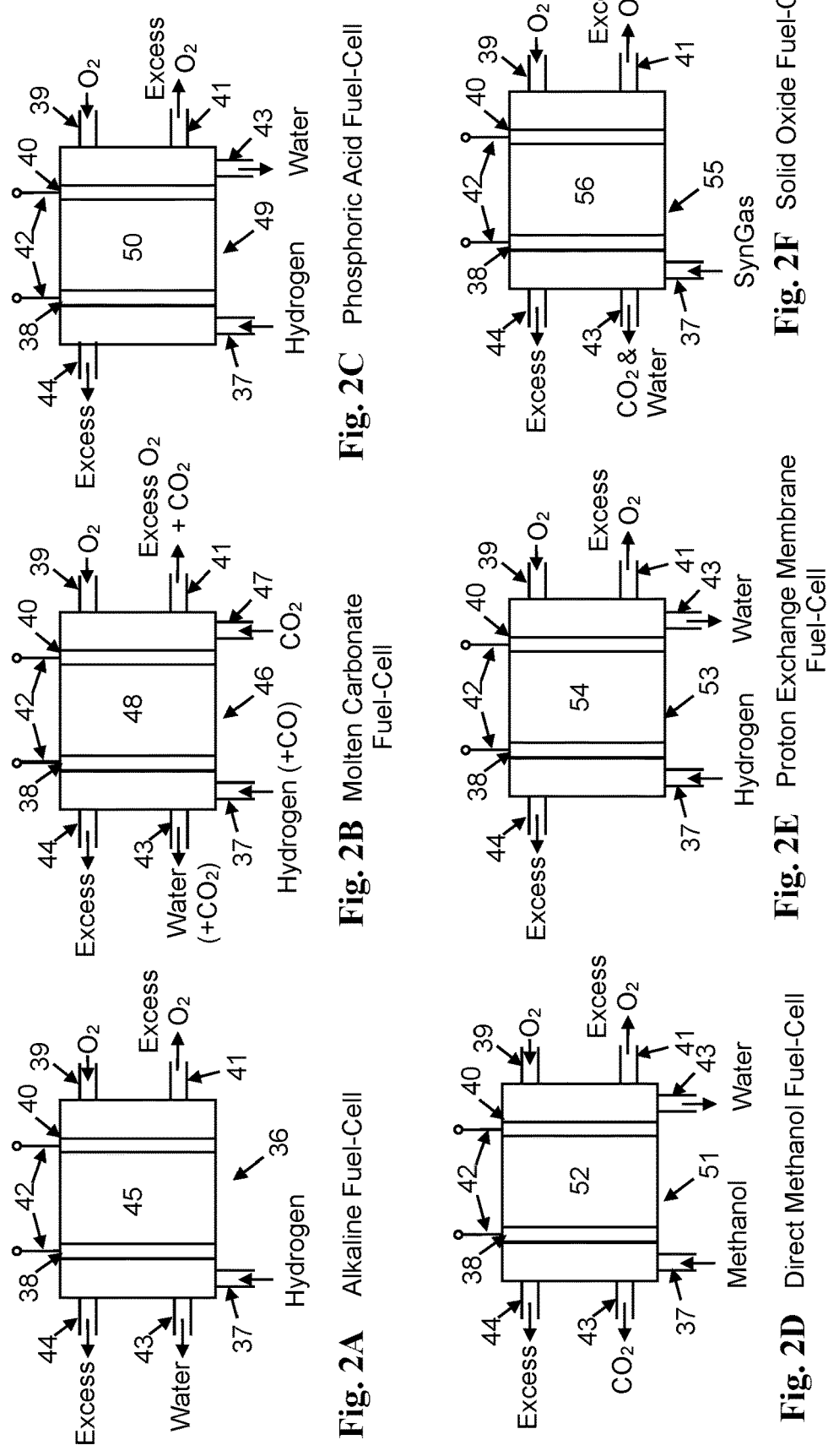
FIG. 2A is a simplified illustrations of an alkaline fuel-cell.
FIG. 2B is a simplified illustrations of a molten carbonate fuel-cell.
FIG. 2C is a simplified illustrations of a phosphoric acid fuel-cell.
FIG. 2D is a simplified illustrations of a direct methanol fuel-cell.
FIG. 2E is a simplified illustrations of a proton exchange membrane fuel-cell.
FIG. 2F is a simplified illustrations of a solid oxide fuel-cell.

FIG. 2A is a simplified illustrations of an alkaline fuel-cell 36. The alkaline fuel-cell has an input 37 for Hydrogen in the anode 38 side, and an input 39 for Oxygen in the cathode 40 side. The Oxygen may be provided as ambient air, and therefore there may be an output 41 at the cathode side for removing air less the used Oxygen (and/or excess O2). Output electricity is provided via electrodes 42, that may be connected to load balancer system 29.

Hydrogen may be provided to the alkaline fuel-cell 36 in a mixture of gases (e.g., sub-mixture provided from a respective separator output 25 of separator subsystem 12). Output 43 may be provided at the cathode side for water, and output 44 may be provided for excess fluid that may include other gases of the sub-mixture provided to the input 37 as well as excess hydrogen. Such excess fluid and/or gases may be collected and returned to the pipe system and respective containers 27.

Alkaline fuel-cell 36 may use an alkaline electrolyte 45 such as potassium hydroxide in water and typical operating temperatures are around 70° C. A catalyst (not shown) employing non-precious metals such as Nickel can be used to speed up the reactions at the anode and cathode. Conversion efficiency of fuel to electricity may reach 60%. Output power may reach over 100 kW. Several alkaline fuel-cells of different configurations and/or power output may be used to produce electric power at maximum efficiency adapted to demand, cost and price considerations as determined by controller 14.

FIG. 2B is a simplified illustrations of a molten carbonate fuel-cell 46. The molten carbonate fuel-cell has an input 37 for Hydrogen (with or without CO) in the anode 38 side, an input 47 for $CO_2$ in the cathode 40 side, and an input 39 for Oxygen in the cathode 40 side. The Oxygen may be provided as ambient air, and therefore there may be an output 41 at the cathode side for removing air less the used Oxygen (and/or excess O2). Output electricity is provided via electrodes 42, that may be connected to load balancer system 29.

Hydrogen may be provided to the molten carbonate fuel-cell 46 in a mixture of gases (e.g., sub-mixture provided from a respective separator output 25 of separator subsystem 12). Similarly, $CO_2$ may be provided to the molten carbonate fuel-cell 46 in a mixture of gases (e.g., sub-mixture provided from a respective separator output 25 of separator subsystem 12).

Output 44 may be provided in the anode 38 side for excess fluid that may include other gases of the sub-mixture provided to the input 37 as well as excess hydrogen. Output 41 may be provided in the cathode 40 side for removing air less the used Oxygen (and/or excess O2) as well as excess $CO_2$. Such excess fluids and/or gases may be collected and returned to the pipe system and respective containers 27. Output 43 may be provided at the cathode side for water, being a product of a typical fuel-cell reaction.

Molten carbonate fuel-cell 46 may use electrolyte 48 such as molten carbonate salt suspended in a porous ceramic matrix. Such salt may include lithium carbonate, potassium carbonate, and sodium carbonate as potassium hydroxide in water. The typical operating temperatures are around 650° C.

A catalyst (not shown) employing a noble metal can be used to speed up the reaction. Conversion efficiency of fuel to electricity may reach 80%. Output power may reach over 100 kW. Several molten carbonate fuel-cells of different configurations and/or power output may be used to produce electric power at maximum efficiency adapted to demand, cost and price considerations as determined by controller 14.

FIG. 2C is a simplified illustrations of a phosphoric acid fuel-cell 49. The phosphoric acid fuel-cell has an input 37 for Hydrogen on the anode 38 side, and an input 39 for Oxygen on the cathode 40 side. The Oxygen may be provided as ambient air, and therefore there may be an output 41 at the cathode side for removing air less the used Oxygen (and/or excess O2). Water output 43 is provided on the cathode side. Output electricity is provided via electrodes 42, that may be connected to load balancer system 29.

Hydrogen may be provided to the phosphoric acid fuel-cell 49 in a mixture of gases (e.g., sub-mixture provided from a respective separator output 25 of separator subsystem 12). Therefore, output 44 may be provided in the anode 38 side for excess fluid that may include other gases of the sub-mixture provided to the input 37 as well as excess hydrogen. Excess fluids and/or gases from output 44 may be collected and returned to the pipe system and respective containers 27.

Phosphoric acid fuel-cell 49 may use electrolyte 50 such as phosphoric acid in a silicon carbide structure. A catalyst (not shown) employing, for example, platinum, can be used to speed up the reaction. Conversion efficiency of fuel to electricity may reach 80%. Output power may reach over 100 kW. Phosphoric acid fuel-cell 49 may operate at temperatures around 180° C. to generate up to 400 kW of electricity with conversion efficiency reaching 80%.

Several phosphoric acid fuel-cell 49 of different configurations and/or power output may be used to produce electric power at maximum efficiency adapted to demand, cost and price considerations as determined by controller 14.

FIG. 2D is a simplified illustrations of a direct methanol fuel-cell 51. The methanol fuel-cell has an input 37 for methanol on the anode 38 side, and an input 39 for Oxygen on the cathode 40 side. The Oxygen may be provided as ambient air, and therefore there may be an output 41 at the cathode side for removing air less the used Oxygen (and/or excess O2). Water output 43 is provided on the cathode side. Output electricity is provided via electrodes 42, that may be connected to load balancer system 29.

Methanol ($CH_3OH$) may be provided to the methanol fuel-cell 51 in a mixture of gases (e.g., sub-mixture provided from a respective separator output 25 of separator subsystem 12). Therefore, output 44 may be provided in the anode 38 side for excess fluid that may include other gases of the sub-mixture provided to the input 37 as well as excess Methanol. Excess fluids and/or gases from output 44 may be collected and returned to the pipe system and respective containers 27.

Methanol fuel-cell 51 may use electrolyte 52 such as a polymer membrane and a catalyst (not shown) such as platinum-ruthenium on the anode. Output power may reach over 100 kW. Methanol fuel-cell 51 may operate at temperatures around 60° C. to 130° C. to generate kilowatts of electricity with relatively low conversion efficiency. Several methanol fuel-cell 51 of different configurations and/or power output may be used to produce electric power at maximum efficiency adapted to demand, cost and price considerations as determined by controller 14.

FIG. 2E is a simplified illustrations of a proton exchange membrane fuel-cell 53. The proton exchange membrane fuel-cell 53 has an input 37 for Hydrogen on the anode 38 side, and an input 39 for Oxygen on the cathode 40 side. The Oxygen may be provided as ambient air, and therefore there may be an output 41 at the cathode side for removing air less the used Oxygen (and/or excess O2). Water output 43 is provided on the cathode side. Output electricity is provided via electrodes 42, that may be connected to load balancer system 29.

Hydrogen may be provided to the proton exchange membrane fuel-cell 53 in a mixture of gases (e.g., sub-mixture provided from a respective separator output 25 of separator subsystem 12). Therefore, output 44 may be provided in the anode 38 side for excess fluid that may include other gases of the sub-mixture provided to the input 37 as well as excess Hydrogen. Excess fluids and/or gases from output 44 may be collected and returned to the pipe system and respective containers 27.

Proton exchange membrane fuel-cell 53 may use an acidic polymer membrane (water-based or mineral-based) as its electrolyte 54 with platinum-based electrodes (not shown). Proton exchange membrane fuel-cell 53 may operate at temperatures up to 200° C. to generate up to 500 kW of electricity with conversion efficiency of about 50%. Several proton exchange membrane fuel-cell 53 of different configurations and/or power output may be used to produce electric power at maximum efficiency adapted to demand, cost and price considerations as determined by controller 14.

FIG. 2F is a simplified illustrations of a solid oxide fuel-cell 55. The solid oxide fuel-cell 55 has an input 37 for SynGas on the anode 38 side, and an input 39 for Oxygen on the cathode 40 side. The Oxygen may be provided as ambient air, and therefore there may be an output 41 at the cathode side for removing air less the used Oxygen (and/or excess O2). Water output 43 is provided on the cathode side. Output electricity is provided via electrodes 42, that may be connected to load balancer system 29. SynGas is typically a mixture consisting primarily of Hydrogen, carbon monoxide (CO), and very often some carbon dioxide ($CO_2$) and possibly some hydrocarbons.

SynGas may be provided to the solid oxide fuel-cell 55 from a respective separator output 25 of separator subsystem 12. Therefore, output 44 may be provided in the anode 38 side for excess fluid that may include other gases of the sub-mixture provided to the input 37 as well as excess Hydrogen. Excess fluids and/or gases from output 44 may be collected and returned to the pipe system and respective containers 27.

Solid oxide fuel-cell 55 may use solid ceramic electrolyte 56, such as zirconium oxide stabilized with yttrium oxide. Solid oxide fuel-cell 55 may operate at temperatures of 800° C. to 1,000° C. and therefore may not need cooling of the pyrolytic fluid. Solid oxide fuel-cell 55 may generate MWs of electricity with conversion efficiency of about 60%. Several proton exchange membrane fuel-cell 53 of different configurations and/or power output may be used to produce electric power at maximum efficiency adapted to demand, cost and price considerations as determined by controller 14.

The various types of fuel-cells described above are provided as example of different technologies that may use different types of input sub-mixtures provided by the pyrolysis reactor 11 via the separator subsystem 12. Other types of fuel-cell and technologies are also contemplated.

Returning to FIG. 1, it is appreciated that generator system 10 for generating electricity from plastic materials, including pyrolysis reactor 11, a fluid separator 12, a plurality of fuel-cell devices 13, and controller 14 controlling the abovementioned elements according to input signals such as signals representing a demand for electric power, signals representing cost of operating at least one of the pyrolysis reactor and the fuel-cell generator, and signals representing minimum price of electric power.

For example, the controller 14 may determine flows such as the flow of plastic materials into the pyrolysis input, and flow of sub-mixtures of hydrocarbons into each fuel-cell generator.

For example, separator subsystem 12 may separate the pyrolysis fluid received from pyrolysis reactor 11 into sub mixtures, such as a sub mixture containing hydrogen, a sub mixture containing hydrogen and carbon monoxide (with or without carbon dioxide), a sub mixture containing $CO_2$, a sub mixture containing methanol, a sub mixture containing syngas or a similar mixture, etc. Each such sub-mixture may be provided to a respective one or more fuel-cells. The amount of each such sub-mixture provided to the respective fuel-cell may be determined by controller 14 according to the signal received and optimization rules as determined by a user.

For example, the controller 14 may determine the heating of the pyrolysis reactor 11 by controlling the inductive heating device 20, which may heat one or more inductive elements within the pyrolysis reactor 11. For example, inductive elements comprising ferromagnetic and ferrimagnetic materials. The inductive heating device 20 may include an electric power input connected to one or more fuel-cell devices 13 (e.g., via load balancer system 29). Controller 14 may determine the amount of electricity provide to the inductive heating device 20, for example to control the temperature inside pyrolysis reactor 11.

The separator subsystem 12, may include an output for light combustion fluid adapted for internal combustion engine. The internal combustion electric generator may include a generator of electricity mechanically coupled to an internal combustion engine coupled to an output of the separator for receiving fuel. Controller 11 may determine the flow of the light combustion fluid according to the abovementioned signals.

The separator subsystem 12, may include an output for heavy combustion fluid adapted for external combustion engine. The external combustion electric generator may include a generator of electricity mechanically coupled to a steam boiler thermally coupled to a combustion chamber coupled to an output of the separator for receiving fuel. Controller 11 may determine the flow of the heavy combustion fluid according to the abovementioned signals.

Fuel-cell devices 13 may include any number of fuel cells of fuel-cell types such as: a hydrogen fuel cell, an alkali fuel cell, a molten carbonate fuel cell, phosphoric acid fuel cell, a proton exchange membrane fuel cell, a solid oxide fuel cell, and direct methanol fuel cell. Controller 11 may determine the flow of a respective fuel or sub-mixture into each of the fuel cells according to the fuel cell type. Controller 11 may also control the temperature of the flow of the respective fuel or sub-mixture into each of the fuel cells according to the fuel cell type.

Figure 3:
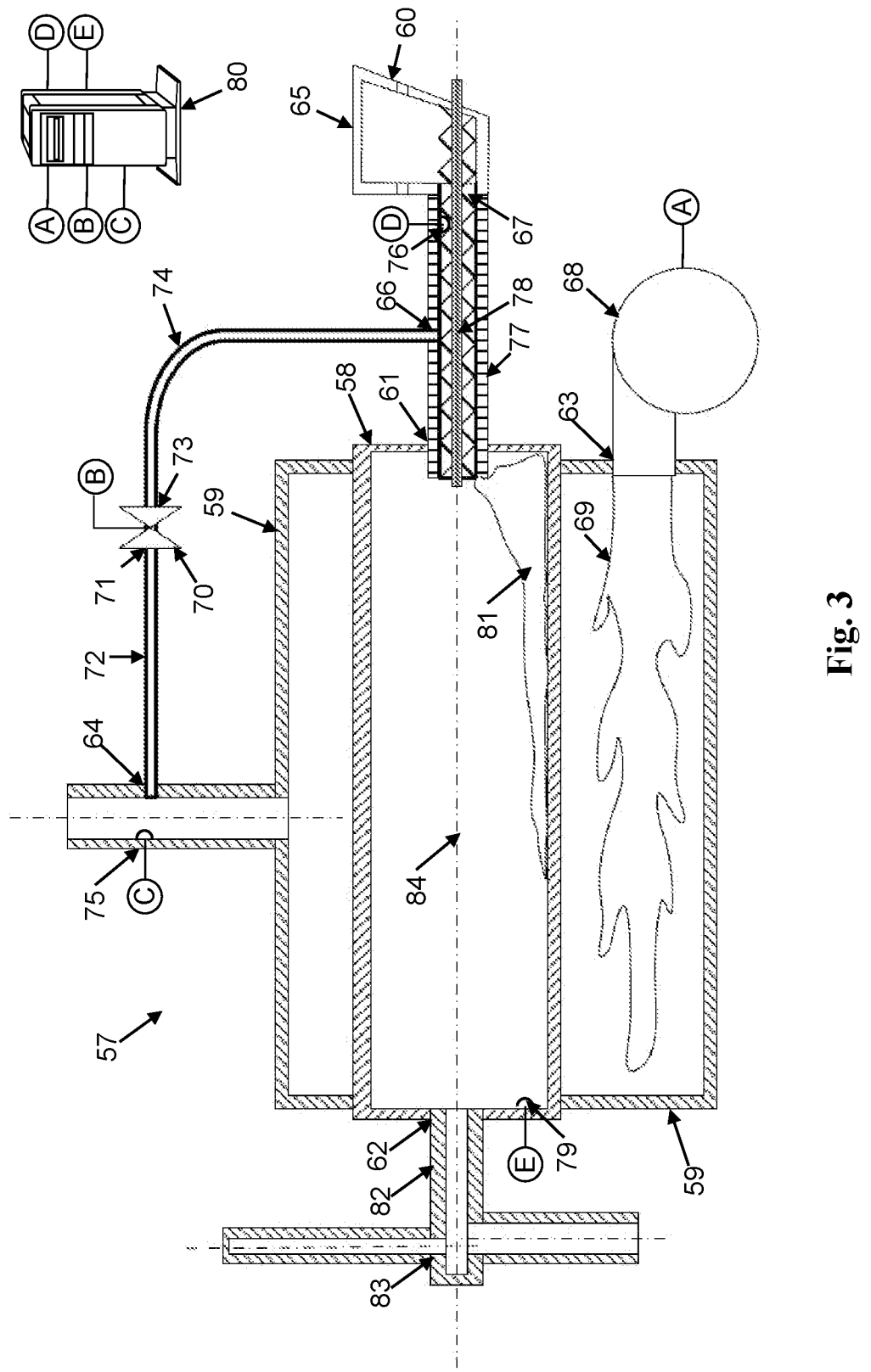
FIG. 3 is a simplified illustration of a cut through a continuous pyrolysis system.

Reference is now made to FIG. 3, which is a simplified illustration of a cut through a continuous pyrolysis system 57, according to one exemplary embodiment.

As shown in FIG. 3, continuous pyrolysis system 57 may include a pyrolysis chamber 58, a heating chamber 59, and a feeding chamber 60. Pyrolysis chamber 58 may typically include a first input opening 61, and a first output opening 62.

Heating chamber 59 may typically include a second input opening 63, and a second output opening 64. Feeding chamber 60 may typically include a third feeding opening 65 opened to ambient atmosphere and arranged to receive grinded and/or shredded material, a third pressure opening 66, and a third output opening 67 coupled to the first input opening 61 of the pyrolysis chamber 58. The grinded and/or shredded materials may typically be plastic materials such as polyethylene, polypropylene, etc. These materials may be grinded and/or shredded to pieces of substantially similar size to achieve even distribution of heat among the grinded and/or shredded particles.

Continuous pyrolysis system 57 may additionally include a flame injector (e.g., burner) 68 coupled to the second input opening 63 of the heating chamber 59. Flame injector device 68 is arranged to collect ambient air and pump, or inject, it into heating chamber 59 through second input opening 63. Flame injector device 68 is additionally arranged to inject flammable material into heating chamber 59 through the second input opening 63. For example, flame injector device 68 may mix the flammable material with the ambient air, ignite the flammable material into a burning flame, and inject the combustible (burning) material 69 into the heating chamber 59 through the second input opening 63. Particularly, flame injector device 68 may control the amount of each of the flammable material with the ambient air, and/or to control the mixture ratio between the flammable material and the ambient air.

Continuous pyrolysis system 57 may additionally include a pumping device 70 that may typically include an input opening 71 coupled to the second output opening 64 of the heating chamber, typically through a pipe 72, and an output opening 73 coupled to the third pressure opening 66 of the feeding chamber, typically through a pipe 74.

Continuous pyrolysis system 57 may additionally include an Oxygen ($O_2$) sensor 75, which may be installed within the heating chamber 59, or in the output of the heating chamber 59, as shown in FIG. 3. The $O_2$ sensor 75 may provide measurements of the $O_2$ content and/or concentration within heating chamber 59 and particularly in the input to pumping device 70. It is appreciated that $O_2$ sensor 75 may be replaced by a $CO_2$ sensor or a similar sensor.

Continuous pyrolysis system 57 may additionally include a pressure transducer 76, which may be installed within the feeding chamber 60. As shown in FIG. 3, the third output opening 67 of feeding chamber 60 may be coupled to the first input opening 61 of the pyrolysis chamber 58 through a pipe 77 including a conveyer device 78 and the pressure transducer 76 may be installed inside the pipe 77. The conveyer device 78 may be used to transport grinded material from feeding chamber 60 to pyrolysis chamber 58 through pipe 77. Pressure transducer 76 may provide measurements of the gaseous pressure within feeding chamber 60 and/or pipe 77.

Continuous pyrolysis system 57 may additionally include a temperature sensor 79, which may be installed within the pyrolysis chamber 58, and/or at the output of the pyrolysis chamber 58. Temperature sensor 79 may provide temperature measurements of the gaseous material within pyrolysis chamber 58.

Continuous pyrolysis system 57 may additionally include a controller 80. Controller 80 may be any type of computational device or system, typically including at least one processor, at least one memory and/or storage device, and at least one communication device or interface enabling the processor to communicate input data, and/or output data, and/or control at least one sensor device, actuating device, motor, pump, etc.

Controller 80 may be electrically coupled to, and/or controllably electrically coupled to, flame injector 68 via connecting element A, and to pumping device 70 via connecting element B, and/or to $O_2$ sensor 75 via connecting element C, and/or to pressure transducer 76 via connecting element D, and/or to the temperature sensor 79 via connecting element E.

Controller 80 may be configured to control the flame injector device 68 to inject ambient air and/or combustible material into heating chamber 59, for example, to maintain predetermined temperature, and/or temperature range, for example according to measurements received from temperature sensor 79.

Controller 80 may be additionally configured to control the flame injector device 68 to inject ambient air and/or combustible material into heating chamber 59, for example, to maintain predetermined concentration of $O_2$ within the heating chamber 59. For example, controller 80 may control the concentration of $O_2$ according to measurements received from $O_2$ sensor 75. For example, controller 80 may control the concentration of $O_2$ between 8% and 12%.

Controller 80 may be additionally configured to control the pumping device 70, for example to maintain pressure in the feeding chamber 60, or pipe 77. For example, controller 80 may control the pressure in the feeding chamber 60 according to measurements received pressure sensor 76. For example, controller 80 may control the pressure above the pressure of the ambient atmosphere to prevent ambient air from entering the feeding chamber 60, and/or or pipe 77, and/or pyrolysis chamber 58.

It is appreciated that a maneuvering device such as an electric motor (not shown) may be coupled to pyrolysis chamber 58 and may cause pyrolysis chamber 58 to roll so that the grinded material 81 entering pyrolysis chamber 58 through pipe 77 may distribute throughout pyrolysis chamber 58. It is appreciated that a pyrolysis chamber 58 may roll within heating chamber 59 and/or around input pipe 77 and output pipe 82. It is appreciated that pyrolysis chamber 58 may have the shape of a cylinder, and that the cylinder side (envelop) may be made of a thermally conductive material.

It is appreciated pyrolysis chamber 58 may be coupled via output pipe 82 to a check valve device 83, to enable a continuous flow of gaseous material out of the pyrolysis chamber 58, and to prevent the flow of ambient air into pyrolysis chamber 58 through the output opening.

As shown in FIG. 3, the pyrolysis chamber 58 may be located within the heating chamber 59. The heating chamber 59 may include a rolling input opening 61 and a rolling output opening 62. The input pipe 77 installed within the rolling input opening may be connected between the output opening of the feeding chamber 60 and the input opening of the pyrolysis chamber 58. The output pipe 82 installed within the rolling output opening may be connected between the output opening of the pyrolysis chamber 58 and the check valve device 83. Thus, the pyrolysis chamber may rotate within the heating chamber 59.

Pyrolysis chamber 58 may be rolling about the horizontal axis 84, and/or about the rolling input opening and the rolling output opening described above. Pyrolysis chamber 58 may be rolling to distribute (and re-distribute) the grinded materials 81 throughout the pyrolysis chamber 58, and to distribute the heat throughout the grinded materials 81 in the pyrolysis chamber 58.

Figures 4A, 4B, 5:
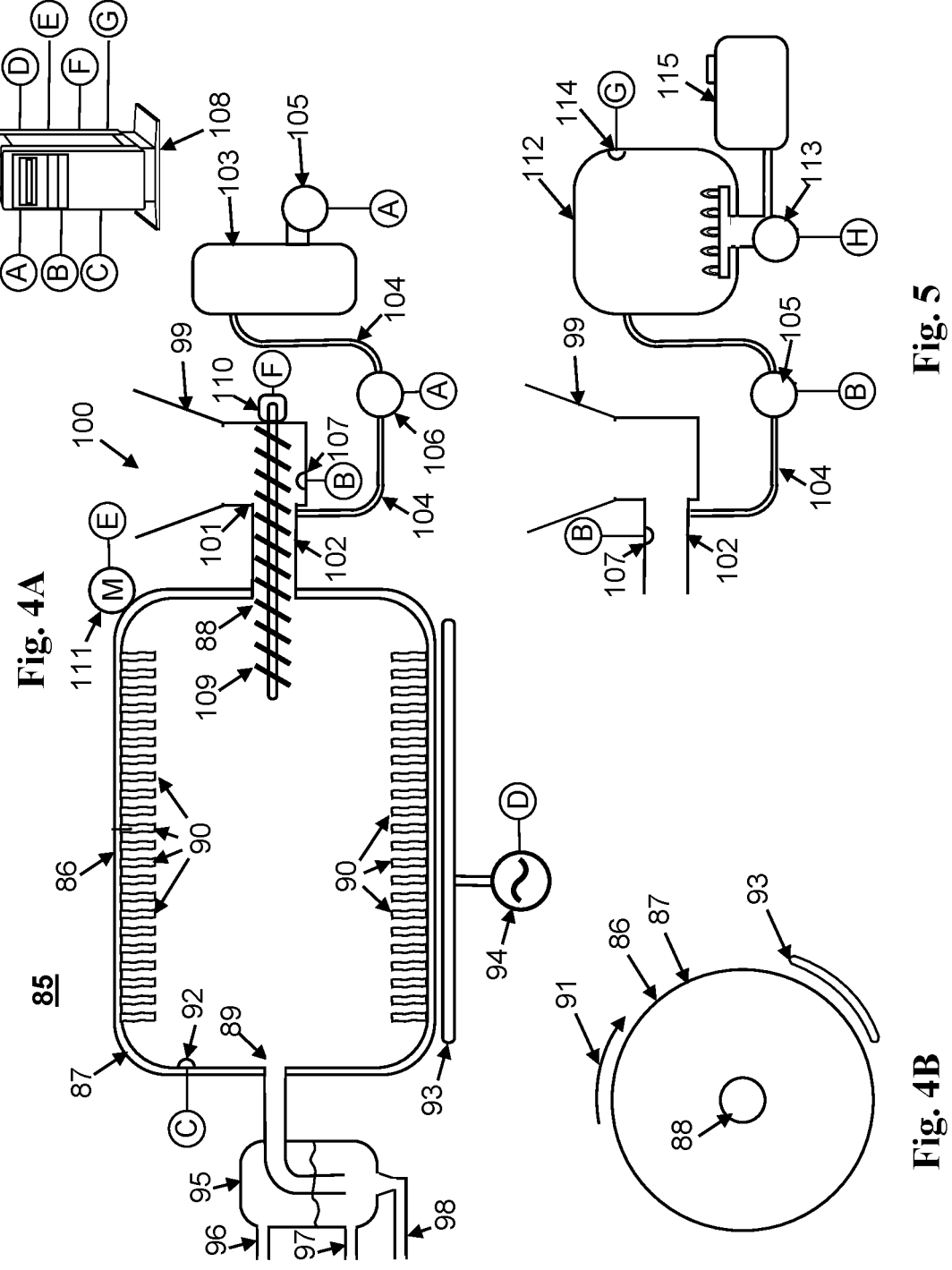
FIG. 4A is a simplified illustration of cut through an inductive continuous pyrolysis system.
FIG. 4B is a simplified illustration of a perpendicular side view of the inductive continuous pyrolysis system.
FIG. 5 is a simplified illustration of cut through a heating chamber that may be an optional part of the inductive continuous pyrolysis system.

Reference is now made to FIG. 4A, which is a simplified illustration of cut through a inductive continuous pyrolysis system 85, and to FIG. 4B, which is a simplified illustration of a cut through perpendicular (latitude) side view of inductive continuous pyrolysis system 85, according to one exemplary embodiment.

As an option, the illustrations of FIG. 4A and FIG. 4B may be viewed in the context of the previous Figures. Of course, however, the illustrations of FIG. 4A and FIG. 4B may be viewed in the context of any desired environment. Further, the aforementioned definitions may equally apply to the description below.

As shown in FIG. 4A, inductive continuous pyrolysis system 85 may include a pyrolysis chamber 86, including a thermally insulating wall 87, an input opening 88 and an output opening 89 in the wall 87, and inductive thermal elements 90.

As stated above, the term inductive in 'inductive continuous pyrolysis system 85' and elsewhere may refer to any type of electrically heated continuous pyrolysis system.

As shown in FIG. 4B, inductive continuous pyrolysis system 85 may have the shape of a cylinder and may rotate along its axis, for example, around the openings 88 and 89, for example, as shown by arrow 91, pyrolysis system 85 may be rolling to distribute (and re-distribute) the grinded materials throughout the pyrolysis chamber, and to distribute the heat throughout the grinded materials in the pyrolysis chamber.

Inductive thermal elements 90 may be distributed throughout pyrolysis chamber 86, or within a limited area of pyrolysis chamber 86. Inductive thermal elements 90 may be fixed, such as attached to the 87 of pyrolysis chamber 86. Alternatively, inductive thermal elements 90 may be free to move within pyrolysis chamber 86, such as small rods or beads. A temperature sensor 92 may be installed inside pyrolysis chamber 86.

Inductive continuous pyrolysis system 85 may additionally include an induction radiator 93, that may installed beside the wall 87 of pyrolysis chamber 86, on the outside of pyrolysis chamber 86. Induction radiator 93 may be attached to the wall 87 of pyrolysis chamber 86. Induction radiator 93 may be radiatively coupled to the inductive thermal elements 90 using electromagnetic radiation. Induction radiator 93 may include, or may be electrically coupled to, a power supply 94 to feed electric current to induction radiator 93.

Inductive continuous pyrolysis system 85 may additionally include a separator 95 coupled to opening 89. Separator 89 may separate the output produced by pyrolysis chamber 86 into gas material (via opening 96), liquid material (via opening 97) and solid or ashes material (via opening 98), also functioning as a check valve to eliminate ambient air from entering into pyrolysis chamber 86 through opening 89. As shown in FIG. 4A, separator 95 is arranged as an anti-syphon trap, however, other arrangements are contemplated.

Alternatively, as shown in FIG. 4B, induction radiator 93 may be placed close to the wall 87 of pyrolysis chamber 86 without touching the wall 87 so that pyrolysis chamber 86 may rotate with respect to induction radiator 93. Induction radiator 93 may be placed beneath pyrolysis chamber 86. Alternatively, as shown in FIG. 4B, induction radiator 93 may be placed in an angle rotationally preceding the bottom of pyrolysis chamber 86, so that heating of the inductive thermal elements 90 reaches maximum when the respective inductive thermal elements 90 reach the lowest point of pyrolysis chamber 86.

As shown in FIG. 4A, inductive continuous pyrolysis system 85 may additionally include a feeding chamber 99 including an input opening 100 for receiving grinded materials, and an output opening 101 for providing the grinded material to the input opening 88 of pyrolysis chamber 86. The grinded materials may typically be plastic materials such as polyethylene, polypropylene, etc. The output opening 101 of feeding chamber 99 and the input opening 88 of pyrolysis chamber 86 may be connected by tube 102.

Inductive continuous pyrolysis system 85 may additionally include a Nitrogen source 103, such as a Nitrogen generator, such as a membrane nitrogen generator, or a pressure swing adsorption (PSA) nitrogen generator, etc. Nitrogen source 103 may be coupled to feeding chamber 99 or to tube 102, for example via a pipe 104. A pump 105, coupled to the input opening of Nitrogen source 103 may pump air into Nitrogen source 103. Alternatively, or additionally, a pump 106 may be coupled to pipe 104, to pump Nitrogen into feeding chamber 99 or tube 102.

Nitrogen source 103 and pump 105 pump Nitrogen into feeding chamber 99 or tube 102 to maintain pressure above ambient pressure to prevent ambient air from entering pyrolysis chamber 86. Gaseous pressure within feeding chamber 99 or tube 102 may be measured using a pressure sensor 107 installed within feeding chamber 99 or tube 102.

Inductive continuous pyrolysis system 85 may additionally include a controller 108. Controller 108 may be any type of computational device or system, typically including at least one processor, at least one memory and/or storage device, and at least one communication device or interface enabling the processor to communicate input data, and/or output data, and/or control at least one sensor device, actuating device, motor, pump, etc.

Controller 108 may be electrically coupled to, and/or controllably electrically coupled to pumping devices 105 and 106 via connecting elements A, and/or to pressure transducer 107 via connecting element B, and/or to the temperature sensor 92 via connecting element C.

Additionally, controller 108 may be electrically coupled to, and/or controllably electrically coupled via connecting element D to induction radiator 93, for example by controlling power supply 94. Controller 108 may be electrically coupled to, and/or controllably electrically coupled via connecting element E to conveyer 109 carrying the grinded material from feeding chamber 99 into pyrolysis chamber 86, for example by controlling a motor 110. Controller 108 may be electrically coupled to, and/or controllably electrically coupled via connecting element F to motor 111 rotating the pyrolysis chamber 86.

Controller 108 may be configured to control induction radiator 93, and/or conveyer 109, and/or motor 111, for example, to maintain a predetermined temperature and/or temperature range, for example according to measurements received from temperature sensor 92.

To produce a continuous, stable, and controllable electrical power output the generator system 10 may use a plurality of batch reactors, or a single continuous pyrolysis reactor, such as the as the continuous pyrolysis reactor described below.

Reference is now made to FIG. 5, which is a simplified illustration of cut through a heating chamber 112, which may be optional part of inductive continuous pyrolysis system 85, according to one exemplary embodiment.

As an option, the illustration of FIG. 5 may be viewed in the context of the previous Figures. Of course, however, the illustration of FIG. 5 may be viewed in the context of any desired environment. Further, the aforementioned definitions may equally apply to the description below.

The heating chamber 112 of FIG. 5 may replace the Nitrogen source 103 of FIG. 4A. The heating chamber 112 of FIG. 5 operates similarly to the heating chamber 59 of FIG. 3 but serves only to provide low Oxygen gaseous content to feeding chamber 99 or pipe 102.

Heating chamber 112 of FIG. 5 may include a flame thruster 113, and a 02 sensor 114, as well as a source of flammable material 115. Flame thruster 113 may control the amount and mix of ambient air and flammable material, inject the ambient air and flammable material into the heating chamber 112 and ignite a flame to produce gaseous material having low level of $O_2$. Subsequently, controller 108 may be configured to receive $O_2$ measurements from $O_2$ sensor 114 (e.g., via connector G) and control flame thruster 113 (e.g., via connector H) accordingly to produce gaseous material having $O_2$ concentration between 6% and 12%. It is appreciated that $O_2$ sensor may be replaced by a $CO_2$ sensor or a similar sensor.

Reference is now made to FIG. 6A, which is a simplified illustration of cut through the longitude of an inductive continuous pyrolysis system 116 with a stationary pyrolysis chamber 117, and to FIG. 6B, which is a simplified illustration of cut through the latitude of inductive continuous pyrolysis system 116 with the stationary pyrolysis chamber 117, according to one exemplary embodiment.

As an option, the illustrations of FIG. 6A and FIG. 6B may be viewed in the context of the previous Figures. Of course, however, the illustrations of FIG. 6A and FIG. 6B may be viewed in the context of any desired environment. Further, the aforementioned definitions may equally apply to the description below.

As shown in FIG. 6A and FIG. 6B, inductive continuous pyrolysis system 116 may include air pump 105 coupled to the input opening of nitrogen source 103 (such as the nitrogen source 103 of FIG. 4A), which output may be coupled to stationary pyrolysis chamber 117 through pipes 104 and pump 105 pumping Nitrogen into stationary pyrolysis chamber 117.

Stationary pyrolysis chamber 117 may include a feeding chamber 99 with opening 100 for feeding grinded materials into stationary pyrolysis chamber 117, as well as gas output 118 and liquid and ash output 119. Gas output 118 may be coupled to a check valve such as check valve device 83 of FIG. 3, or separator 95 of FIG. 4B, or any similar device.

Stationary pyrolysis chamber 117 may include an inner layer 120 of solid non-ferrous material, an external layer 121 of heat-insulation material, and an inductor (induction radiator) 122 embedded in the external layer. Inductor 122 may include, or may be electrically coupled to, a power supply 94 to feed electric current to inductor 122.

Stationary pyrolysis chamber 117 may include a conveyer, or agitator, such as worm, or spiral, conveyer 123, to distribute throughout the stationary pyrolysis chamber 117 the grinded or shredded material that may be entered via the feeding chamber 99. Conveyer, or agitator, 123 may be made of ferrous material, or a similar material that may absorb the radiation emitted by inductor 122. Hence conveyer, or agitator, 123 may also produce heat and distribute the heat among the grinded or shredded material distributed within stationary pyrolysis chamber 117.

Pyrolysis chamber 117 is stationary in the sense that it is not rolling such as pyrolysis chamber 58 of FIG. 3, and/or pyrolysis chamber 86 of FIG. 4A and FIG. 4B. Instead, the conveyer, or agitator, 123 is rolling to distribute grinded or shredded materials, as well as heat, within pyrolysis chamber 117. Stationary pyrolysis chamber 117 a motor 124 and an axle 125 to rotate conveyer, or agitator, 123.

As shown in FIG. 6A, inductive continuous pyrolysis system 116 may include a computational device (controller) 108, similar to controller 108 of inductive continuous pyrolysis system 85 of FIG. 4A, with similar functions and connections to components of inductive continuous pyrolysis system 116, such as sensors, pumps, and motors. For example, for sensing temperature, pressure, Oxygen concentration, etc. and to control pumps 105 and 106, motor 124, and inductor 122, for example by controlling power supply 94 and/or electric current provided to inductor 122.

Reference is now made to FIG. 7, which is a simplified illustration of cut through the latitude of an inductive continuous pyrolysis system 126 with a dual stationary pyrolysis chamber 127 and two spiral conveyers 128, according to one exemplary embodiment.

As an option, the illustration of FIG. 7 may be viewed in the context of the previous Figures. Of course, however, the illustration of FIG. 7 may be viewed in the context of any desired environment. Further, the aforementioned definitions may equally apply to the description below.

It is understood that a pyrolysis chamber such as stationary pyrolysis chamber 117 may include any number of conveyers, or agitators, such as worm, or spiral, conveyer 128. FIG. 7 shows such dual pyrolysis chamber 127 with two spiral conveyers 128. Other than including two spiral conveyers 128, dual pyrolysis chamber 127 may have a structure similar to pyrolysis chamber 117. Other than the dual pyrolysis chamber 127, continuous pyrolysis system 126 may have structure and components similar to inductive continuous pyrolysis system 116.

Reference is now made to FIG. 8, which is a simplified illustration of cut through the latitude of an inductive continuous pyrolysis system 129 with a dual pyrolysis chamber 130 and two propeller conveyers 131, according to one exemplary embodiment.

As an option, the illustration of FIG. 8 may be viewed in the context of the previous Figures. Of course, however, the illustration of FIG. 8 may be viewed in the context of any desired environment. Further, the aforementioned definitions may equally apply to the description below.

As shown in FIG. 8, inductive continuous pyrolysis system 129 is similar to inductive continuous pyrolysis system 126 of FIG. 7, however including two propeller conveyers 131 instead of the spiral conveyers 128 of inductive continuous pyrolysis system 126. Each of propeller conveyers 131 may include a plurality of 'wings' 132 distributed along the axis 133 of each propeller conveyers 131 so that when being rotated the wings 132 of a first propeller conveyers 131 do not collide with wings 132 of a second propeller conveyers 131.

Figure 9:
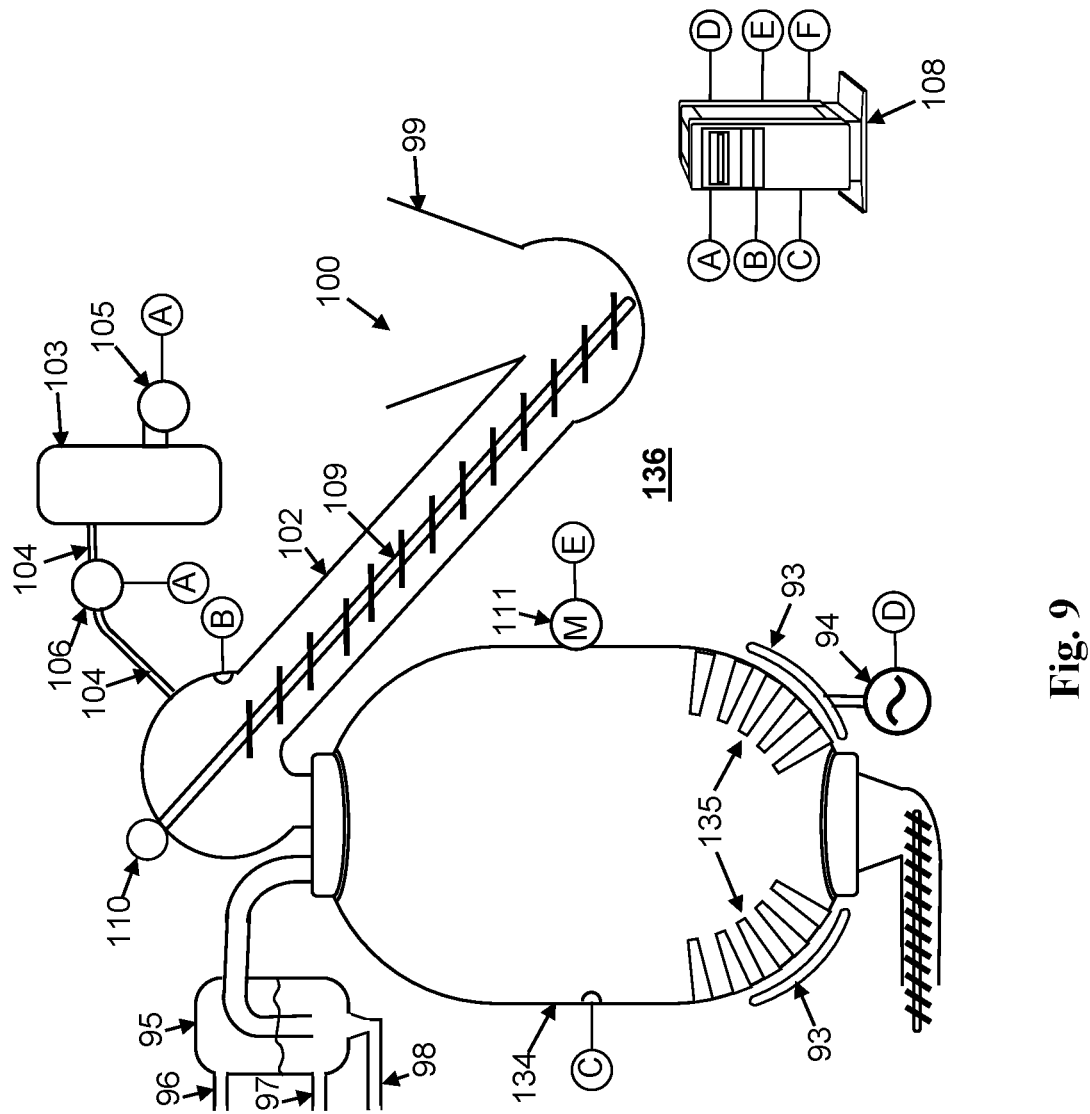
FIG. 9 is a simplified illustration of cut through a vertically rotating inductive continuous pyrolysis system with a fixed agitator.

Reference is now made to FIG. 9, which is a simplified illustration of cut through a vertically rotating pyrolysis chamber 134 with a fixed agitator 135, of an inductive continuous pyrolysis system 136, according to one exemplary embodiment.

As an option, the illustration of FIG. 9 may be viewed in the context of the previous Figures. Of course, however, the illustration of FIG. 9 may be viewed in the context of any desired environment. Further, the aforementioned definitions may equally apply to the description below.

As shown in FIG. 9, inductive continuous pyrolysis system 136 is similar to inductive continuous pyrolysis system 85 if FIG. 4A, however its pyrolysis chamber 134 is rotating about a vertical axis, and therefore the input and outputs of the pyrolysis chamber 134 is arranged accordingly.

It is appreciated that Nitrogen source 103 of inductive continuous pyrolysis system 136 (as shown in FIG. 9) may be replaced by heating chamber 112 of FIG. 5, or any other source of low-Oxygen air, or a similar gas material.

Figure 10:
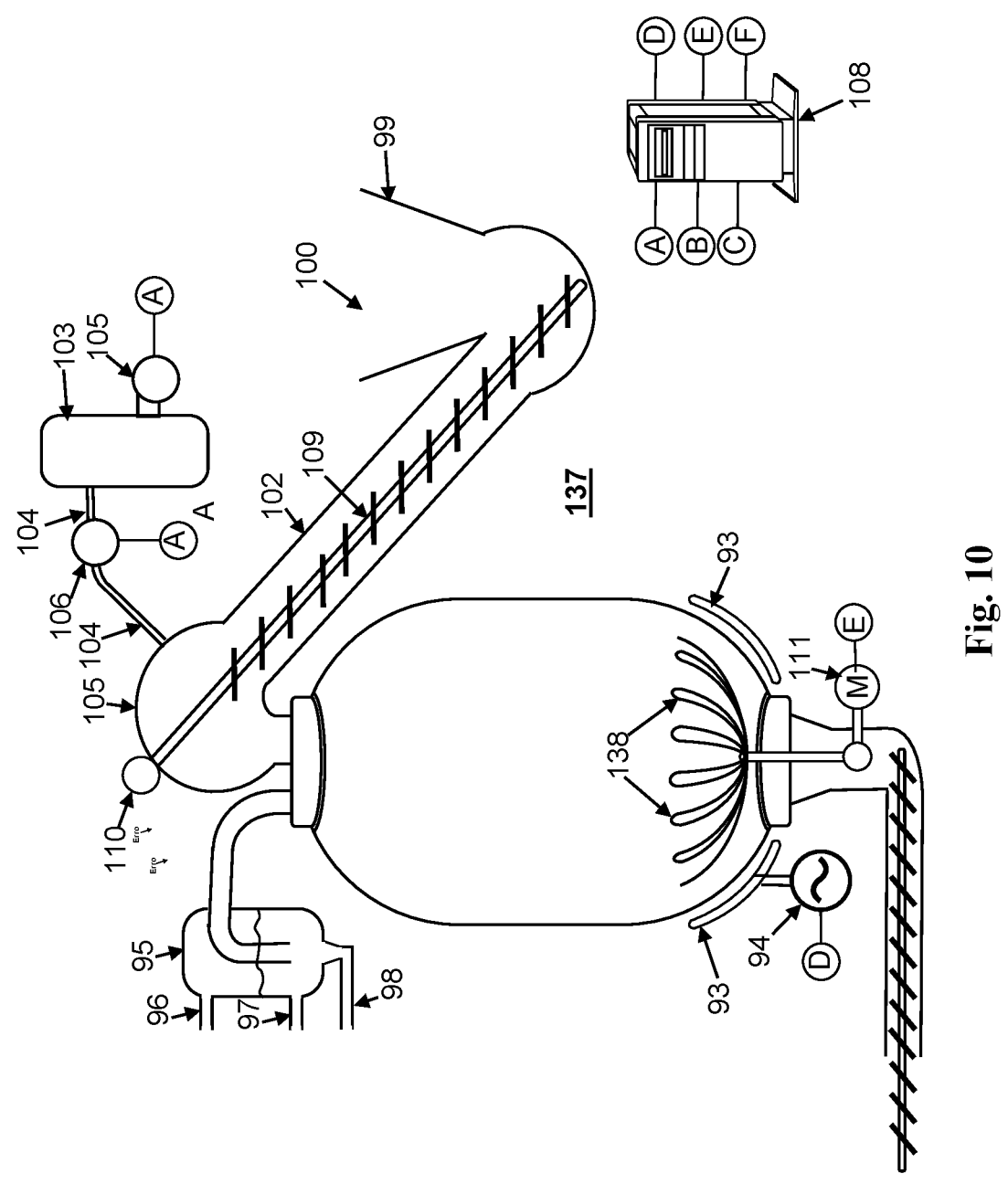
FIG. 10 is a simplified illustration of cut through a vertically stationary inductive continuous pyrolysis system with a vertically rotating agitator.

Reference is now made to FIG. 10, which is a simplified illustration of cut through a vertically stationary inductive continuous pyrolysis system 137 with a vertically rotating agitator 138, according to one exemplary embodiment.

As an option, the illustration of FIG. 10 may be viewed in the context of the previous Figures. Of course, however, the illustration of FIG. 10 may be viewed in the context of any desired environment. Further, the aforementioned definitions may equally apply to the description below.

As shown in FIG. 10, inductive continuous pyrolysis system 137 is similar to inductive continuous pyrolysis system 136 of FIG. 9, however having a vertically rotating agitator 138.

It is appreciated that Nitrogen source 103 of inductive continuous pyrolysis system 137 (as shown in FIG. 10) may be replaced by heating chamber 112 of FIG. 5, or any other source of low-Oxygen air, or a similar gas material.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination.

Although descriptions have been provided above in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

The invention claimed is:

1. A system for generating electricity comprising:
   a pyrolysis reactor comprising a pyrolysis input and a pyrolysis output, and configured to receive an organic material into the pyrolysis input and produce a pyrolysis fluid at the pyrolysis output;
   a fluid separator device comprising a separator input and a plurality of separator outputs, wherein the separator input is coupled to the pyrolysis output and configured to receive the pyrolysis fluid and to separate the pyrolysis fluid into a plurality of sub-mixtures of fluids, wherein each sub-mixture is provided via a respective separator output of the plurality of separator outputs, and wherein the separator additionally comprises at least one of an output for light combustion fluid adapted for internal combustion engine and an output for heavy combustion fluid adapted for external combustion engine;
   at least one fuel-cell device, each fuel-cell device comprising a fuel-cell input coupled to a respective separator output, and an electricity output;
   at least one of:
      an internal combustion electric generator comprising: a generator of electricity mechanically coupled to an internal combustion engine coupled to an output of the separator for receiving fuel; and
      an external combustion electric generator comprising: a generator of electricity mechanically coupled to a steam boiler thermally coupled to a combustion chamber coupled to an output of the separator for receiving fuel; and
   a controller controllably coupled to the pyrolysis reactor, the fluid separator device, and the at least one fuel-cell device, and to at least one of the separator output for light combustion fluid, the separator output for heavy combustion fluid, the internal combustion electric generator, and the external combustion electric generator, and comprising an input for receiving at least one of:
   a signal representing a demand for electric power;
   a signal representing cost of operating at least one of the pyrolysis reactor and the at least one fuel-cell device; and
   a signal representing minimum price of electric power; and
   wherein the controller determines flow of plastic materials into the pyrolysis input, and flow of sub-mixtures of hydrocarbons into each fuel-cell device, wherein each of the flows are determined according to at least one of:
   the signal representing demand for electric power;
   the signal representing cost of operating at least one of the pyrolysis reactor and the fuel-cell device; and
   the signal representing minimum price of electric power.

2. The continuous pyrolysis system according to claim 1, additionally comprising:
   at least one inductive element comprising at least one of ferromagnetic and ferrimagnetic material within the pyrolysis reactor; and
   an inductive heating device for heating the at least one inductive element comprising at least one of ferromagnetic and ferrimagnetic material within the pyrolysis reactor, the inductive heating device comprising an electric power input; and
   wherein the electricity output of at least one fuel cell is electrically coupled to the electric power input of the inductive heating device.

3. The system according to claim 1, wherein the at least one fuel-cell device comprises at least one of:
   a hydrogen fuel cell;
   an alkali fuel cell;
   a molten carbonate fuel cell;
   phosphoric acid fuel cell;
   proton exchange membrane fuel cell;
   solid oxide fuel cell; and
   direct methanol fuel cell;
   wherein each output of the plurality of separator outputs is coupled to at least one respective fuel-cell device; and
   wherein the controller is additionally controllably coupled to at least one of the separator outputs and the respective fuel-cell device.

4. A method for generating electricity comprising:

pyrolyzing an organic material to form pyrolysis fluid;

separating the pyrolysis fluid into a plurality of sub-mixtures of fluids, wherein each sub-mixtures is provided via a respective separator output of a plurality of separator outputs;

separating the pyrolysis fluid into at least one of light combustion fluid adapted for internal combustion engine, and heavy combustion fluid adapted for external combustion engine;

providing at least one of:

an internal combustion electric generator comprising: a generator of electricity mechanically coupled to an internal combustion engine coupled to an output of a separator for receiving fuel; and an external combustion electric generator comprising: a generator of electricity mechanically coupled to a steam boiler thermally coupled to a combustion chamber coupled to an output of the separator for receiving fuel;

generating electricity by at least one fuel-cell device, each fuel-cell device comprising a fuel-cell input coupled to a respective separator output, and an electricity output, and wherein a plurality of the at least one fuel-cell device uses a respective plurality of fuel-cell technologies; and controlling the process of pyrolyzing, separating the pyrolysis fluid, and generating electricity, using a controller controllably coupled to the pyrolysis reactor, the fluid separator device, and the plurality of the at least one fuel-cell devices, and comprising an input for receiving at least one of:

a signal representing a demand for electric power;

a signal representing cost of operating at least one of the pyrolysis reactor and the fuel-cell device; and a signal representing minimum price of electric power; and controlling, using the controller, at least one of:

the separator output for light combustion fluid, the separator output for output for heavy combustion fluid, the internal combustion electric generator, and the external combustion electric generator;

wherein the controller determines flow of organic materials into the pyrolysis input, and flow of sub-mixtures of hydrocarbons into each of the plurality of fuel-cell devices, wherein each of the flows are determined according to at least one of:

the signal representing demand for electric power;

the signal representing cost of operating at least one of the pyrolysis reactor and the fuel-cell device; and the signal representing minimum price of electric power.

5. The method for generating electricity according to claim 4, additionally comprising:

providing at least one inductive element comprising at least one of ferromagnetic and ferrimagnetic material within the pyrolysis reactor;

providing an inductive heating device for heating the at least one inductive element comprising at least one of ferromagnetic and ferrimagnetic material within the pyrolysis reactor, the inductive heating device comprising an electric power input, wherein the electricity output of the at least one fuel-cell device is electrically coupled to the electric power input of the inductive heating device; and controlling the heating of the pyrolyzing using the controller.

6. The method for generating electricity according to claim 4, wherein the at least one fuel-cell device comprises at least one of:

a hydrogen fuel cell;

an alkali fuel cell;

a molten carbonate fuel cell;

a phosphoric acid fuel cell;

a proton exchange membrane fuel cell;

a solid oxide fuel cell; and a direct methanol fuel cell;

wherein each output of the plurality of separator outputs is coupled to at least one of the plurality of the at least one fuel-cell device; and controlling, using the controller, at least one of:

the separator outputs; and a respective fuel-cell device.

* * * * *